United States Patent
Kayanuma

[11] 4,061,950
[45] Dec. 6, 1977

[54] PULSE GENERATING DEVICE FOR REGULATING THE ROTATIONAL SPEED OF A BODY

[75] Inventor: Kanji Kayanuma, Yokohama, Japan

[73] Assignee: Victor Company of Japan, Limited, Japan

[21] Appl. No.: 603,852

[22] Filed: Aug. 12, 1975

[30] Foreign Application Priority Data

| Aug. 13, 1974 | Japan | 49-91953 |
|---|---|---|
| Aug. 13, 1974 | Japan | 49-91954 |
| Aug. 13, 1974 | Japan | 49-91955 |

[51] Int. Cl.$^2$ .................................. H02P 5/00
[52] U.S. Cl. .................................. 318/314; 318/318; 318/341
[58] Field of Search ............ 318/314, 318, 341, 599, 318/313; 307/265, 221 R, 106

[56] References Cited

U.S. PATENT DOCUMENTS

| 3,478,178 | 11/1969 | Grace | 318/314 |
|---|---|---|---|
| 3,675,133 | 7/1972 | Frankeny et al. | 307/265 |
| 3,753,067 | 8/1973 | Milligan | 318/341 |
| 3,965,431 | 6/1976 | Johnson | 307/265 |

OTHER PUBLICATIONS

Kara, B., "Logic Delay Line", IBM Technical Disclosure Bulletin, Oct. 1966, vol. 9, No. 5, p. 488.

Primary Examiner—Robert K. Schaefer
Assistant Examiner—Eugene S. Indyk
Attorney, Agent, or Firm—Robert E. Burns; Emmanuel J. Lobato; Bruce L. Adams

[57] ABSTRACT

A first pulse is electromechanically generated for each rotation of a body and a predetermined number of second pulses are also electromechanically generated for each rotation. The first pulse is applied as an input binary digit to a shift register having storage elements equal in number to the second pulses generated for each rotation. The second pulses are applied as a clock input to the shift register to cause shifting of the binary digit through the storage elements in a step along manner. A plurality of monostable multivibrators are coupled to respective ones of the storage elements to receive the stored content in each storage element. Each of the multivibrators is provided with a manually adjustable time constant value. Adjustment is made of each time constant value to compensate for any possible error in spacing between successive ones of the second pulses due to mechanical tolerances in the manufacture of the electromechanical pulse generating mechanism.

11 Claims, 18 Drawing Figures

PULSE GENERATING DEVICE FOR REGULATING THE ROTATIONAL SPEED OF A BODY

BACKGROUND OF THE INVENTION

The present invention relates generally to apparatus for regulating the speed of rotation of a body, and more specifically to a pulse width correcting or modulating device which provides a train of equally-spaced, speed-related pulses to serve as a speed control signal.

In applications where maintaining a rotating body at a constant speed is of primary concern, a closed-loop control system is provided to compensate for speed variations arising from changes in load. In one application, a speed-related signal is obtained by photoelectrically detecting light-reflective areas or teeth arranged on the circumference of a revolving shaft or body. The signal is in the form of equally spaced pulses at a given speed of rotation, the interval between successive ones of which is inversely proportional to the speed and used to generate a control signal proportional to the pulse interval. However, it is difficult to ensure equal spacing between successive pulses because of the large mechanical tolerances in the manufacture of the light reflecting teeth. unequal pulse spacing will produce a nonuniform control voltage even when the body rotates at a constant speed and can send a false control signal through the feed-back loop.

SUMMARY OF THE INVENTION

Therefore, the primary object of this invention is to enable the closed-loop speed control system which operates free from the aforesaid disadvantage.

More specific objects of the invention are to expedite attainment of a train of equally-spaced, speed-related pulses regardless of possible error in the pulse generating mechanism and to facilitate realization of equally-spaced pulses economically.

Briefly described, the speed control apparatus embodying the invention comprises a first electromechanical pulse generator delivering a pulse for each revolution of a rotating body, a second electromechanical pulse generator delivering a predetermined number of pulses for each revolution with possible error in the pulse spacing which is inversely proportional to the speed of rotation of the body, a shift register having storage elements or flip-flops equal in number to the pulses delivered from the second pulse generator for each revolution and monostable multivibrators each being connected to the output of each of the storage elements. The signal delivered by the first generator is fed into the shift register as a binary input to be shifted through the storage elements in step along manner and the signal delivered by the second generator is applied to the shift register as a clock or shift pulse to cause shifting of the binary input. Each of the multivibrators is provided with a manually adjustable time constant circuit to modulate the pulse width. The time constant values are adjusted individually such that the pulses appearing at the output of each multivibrator are equally spaced apart. Since the pulse spacing represents the speed of rotation, the space-corrected pulses are utilized to generate a control signal to drive the rotating body at a constant speed. Instead of correcting the spacing between successive pulses, the trailing edges of successive pulses may be adjusted to occur at equal intervals. The present invention may be utilized to effect phase control of the rotating body with respect to a reference pulse source in order to control the angular position of the body and further utilized to effect both speed and phase control simultaneously. The pulse width adjustment can be easily effected by viewing the traces on an oscilloscope screen.

The invention is thus characterized in that the serially delivered speed-related, unequally spaced-apart pulses are distributed into respective monostable multivibrators of the type described and the spacing between successive pulses are corrected so that the apparatus of the invention eliminates the need to use a high precision type pulse generating mechanism.

BRIEF DESCRIPTION OF THE DRAWINGS

The invention will be further described in detail with reference to the accompanying drawings, in which.

DESCRIPTION OF THE PREFERRED EMBODIMENTS

Figure 3:
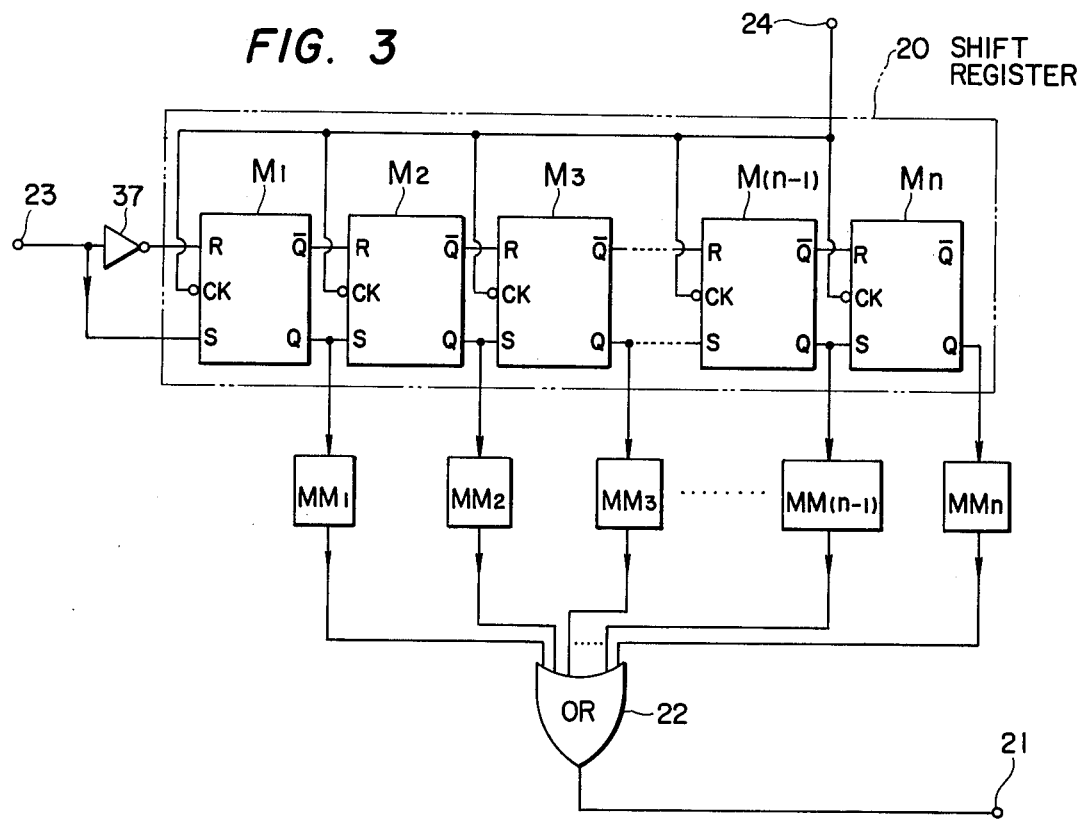
FIG. 3 is a detailed circuit of the pulse width modulator of FIG. 1.

The invention will be described first with reference to FIG. 1. A rotating body or disc 10 is shown mounted on a shaft 11 which is coupled to and driven by drive means such as a motor 12 which is in turn supplied with a control signal to be described. The drive shaft 11 is provided with a first light reflecting portion in the form of a tooth or prong 13 and a set of circumferentially arranged second light reflecting portions as in the form of teeth 14. In proximity of the first light reflecting prong 13 there is a first photoelectrical detecting device 15 consisting of a light source and a photosensor such as a photodiode, which diode together with the prong 13 constitutes a first pulse generator 17. A second photoelectrical detecting device 16 is located in proximity to the second light reflecting portions 14, constituting a second pulse generator 18. When the shaft 11 is rotated, a pulse is generated from the device 15 for each rotation of the shaft, and also a series of pulses is generated in response to the teeth 14 from the device 16 for each rotation. A pulse width modulator 19 is provided which comprises, in accordance with the invention as shown in FIG. 3, a shift register 20 comprising a row of storage elements such as flip-flops $M_l$ and $M_n$, the number of which is equal to the number of pulses generated for each rotation of the shaft 11 from the pulse generator 18, and a plurality of monostable multivibrators $MM_l$ to $MM_n$ which are coupled to the Q output terminals of the flip-flops to generate a series of pulses in response to the outputs from the flip-flops. Each of the monostable multivibrators is provided with a manually adjustable time constant circuit, the adjustment of which causes the pulse width of the output from each multivibrator to vary, that is, the trailing edge of the pulse can be adjusted to occur at a time position within an allowable range determined by each time constant circuit. The time constant adjustment is effected by a variable resistor or a variable capacitor of the RC time constant circuit which is not shown because those skilled in the art can readily understand it. The output from each of the multivibrators $MM_l$ to $MM_n$ is connected to the output terminal 21 through an OR gate 22.

The signal from the pulse width modulator or corrector 19 is coupled to an inverter 25 which inverts its polarity and delivers the inverted signal to first and second utilization circuits in dashed rectangles 26 and 27, respectively. The first utilization circuit 26 modifies the input signal to develop a speed-related voltage and the second utilization circuit 27 modifies the input signal into a phase-related voltage. These signals are combined at a summing circuit or adder 28 and amplified by an amplifier 29 to a sufficient level required to drive the motor 12.

The first or speed control utilization circuit 26 comprises a monostable multivibrator 30 to provide a pulse of predetermined duration which is inverted by an inverter 31 and coupled to a ramp circuit 32 which in turn generates a sawtooth wave or incremental voltage in response to the input thereto. The signal from the ramp circuit 32 is received by a sample-hold circuit 33 in which the received incremental voltage is sampled by the output from the monostable multivibrator 30.

The second or phase control utlization circuit 27, on the other hand, comprises a reference pulse generator 34 which provides a series of regularly occurring pulses of constant duration to serve as reference phasing information. The phasing information is received by a ramp circuit 35 which in response thereto produces a linearly increasing voltage and applies it to a sample-hold circuit 36 which samples it by the output from the inverter 25.

Figure 1:
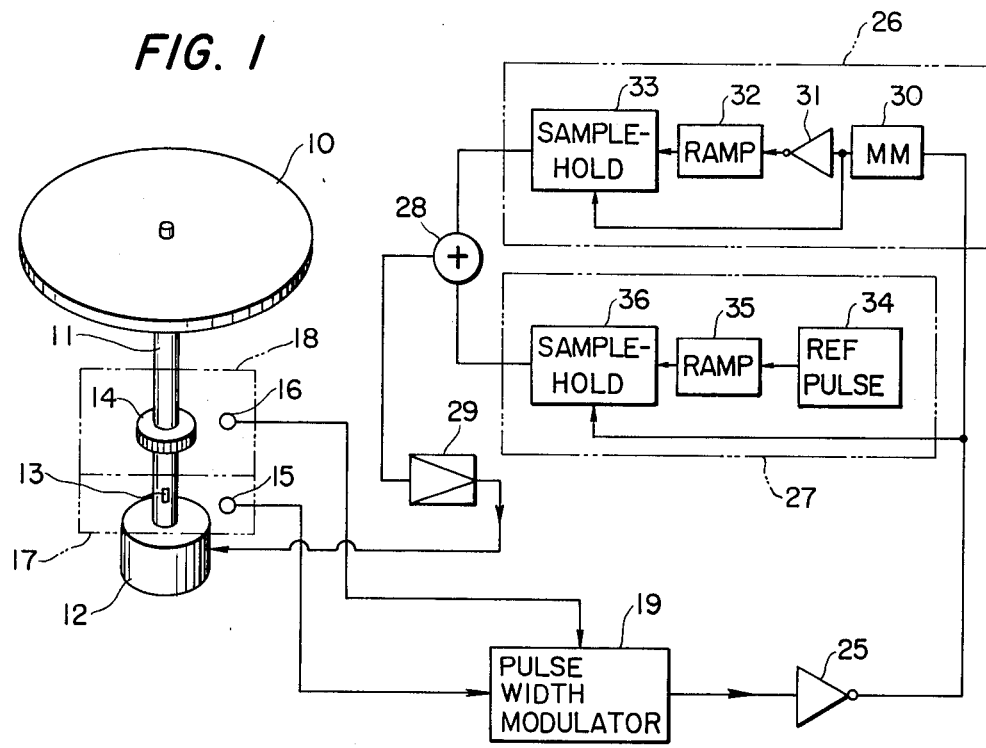
FIG. 1 is a schematic diagram of an embodiment of the invention.
Figure 2A:
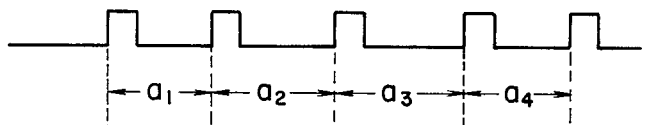
FIGS. 2a–2g is a waveform diagram useful for describing the operation of the FIG. 1 circuit.
Figure 2B:
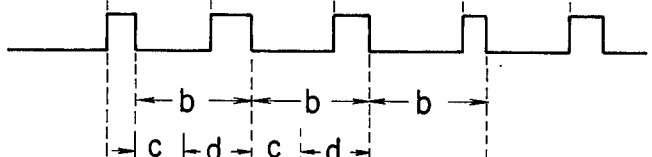
Figure 2C:
Figure 2D:
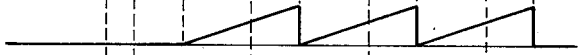
Figure 2E:
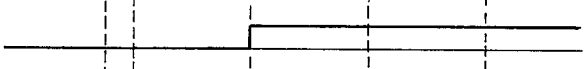
Figure 2F:
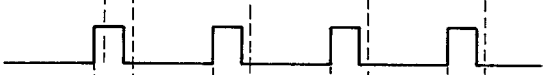
Figure 2G:
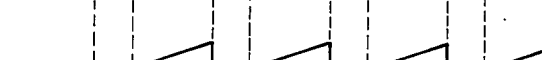

The waveform shown in FIG. 2 illustrates the actual operation of the circuit of FIG. 1. Each of the pulses generated by the second pulse generator 18 for each shaft revolution occurs at unequal intervals $(a_1, a_2 ... a_n)$ with nonuniform pulse duration due to mechanical inaccuracy of the pulse generating teeth 14, as shown in FIG. 2a. This train of pulses is applied to the clock terminal 24 of shift register 20 to successively trigger each of the flip-flops $M_l$ to $M_n$ to shift the input which has been applied through an inverter 37 to the reset input terminal of flip-flop $M_l$ and to the set terminal thereof through terminal 23 of shift register 20. The Q output of each flip-flop goes high at the leading edge of the clock input and falls to zero level at the leading edge of the next clock pulse. Because of the nature of the monostable multivibrator, each of the multivibrators $MM_l$ to $MM_n$ produces a pulse of duration determined by the adjustment of their time constant values. This adjustment can be made, for example, by viewing the waveform of the pulses at the output of the multivibrators $MM_l$ to $MM_n$ on the screen of an oscilloscope. In the present embodiment the adjustment is made such that the interval between the trailing edges of successive pulses at the multivibrator output is equal to each other as shown in FIG. 2b. These pulses, after polarity inversion at 25 drive the monostable multivibrator 30 to produce at the leading edges of the inverted pulses (the trailing edges of the pulses at the outputs of multivibrators $MM_l$ to $MM_n$) pulses of predetermined, equal duration $c$ with an equal time interval $d$ between successive pulses (see FIG. 2c). The output from multivibrator 30 is inverted to utilize its trailing edge to trigger the ramp circuit 32 (FIG. 2d) which in turn produces a train of regularly occurring, linearly increasing voltage pulses (FIG. 2d). The output from multivibrator 30 is connected to the sample-hold circuit 33, in which the ramp circuit output is also received, in order to utilize the leading edge of the output from multivibrator 30 to trigger the sampling action of the sample-hold circuit 33 and the sampled voltage remains at a constant level at a given speed of rotation of the body 10 (see FIG. 2e). As the speed of rotation increases the intervals between successive pulses at the output of multivibrator 30 will be made smaller resulting in a low sampled voltage, while with the speed of rotation decreasing the pulse intervals will become longer with the resultant increase in the sampled voltage. On the other hand, a train of regularly occurring pulses generated by reference source 34 as shown in FIG. 2f is applied to ramp circuit 35 to generate sawtooth wave pulses (FIG. 2g) which are sampled in the sample-hold circuit 36. Sampling occurs at the leading edge of the inverted pulses at the output of inverter 25 (trailing edge of the output from the pulse width modulator 19). The sampled voltage thus represents the difference in phase between the trailing edge of the modulator output and the reference pulses and remains at a constant level at a given speed of rotation of the body or disc 10. Upon the occurrence of the next pulse from the first pulse generator 17, the shift register 20 is cleared and at the same time conditioned to receive clock pulses of the next train. Once the adjustment is made of each of the multivibrator $MM_l$ to $MM_n$, the spacings between successive pulses therefrom are corrected.

Speed and phase control thus can be effected by coupling the combined signal available at the output of adder 28 through amplifier 29 to the drive motor 12.

Speed control can be effected in a modified way by equalizing the intervals between successive pulses at the output of modulator 19 instead of equalizing the interval between the trailing edges of successive pulses at the modulator output as previously described. In order to utilize equally spaced-apart pulses for speed control purposes the speed control utilization circuit 26 of FIG. 1 is modified into a form shown in FIG. 4 which comprises a ramp circuit 40 and a sample-hold circuit 41. Each of the multivibrators $MM_l$ to $MM_n$ of pulse width modulator 19 is adjusted such that the intervals between successive pulses at the output of multivibrators are equal to as shown in FIG. 5b. The equally spaced, polarity-inverted pulses at the output of inverter 25 are received by the ramp circuit 40 to generate a sawtooth wave voltage at the trailing edge of the pulses at the modulator output 19 (see FIG. 5c). The signal for sampling the voltage from the ramp circuit output is obtained from the pulse generator 18 which produces a train of unequally spaced-apart pulses (FIG. 5a) and applied to the sample-hold circuit 41. Similar sampling is effected by connecting the output from the modulator 19 directly to the sampling terminal of circuit 41 as indicated by a dashed line 43 and cutting off the connection between the generator 18 and circuit 41 as at 44.

The time interval between successive pulses at the modulator output are preferably adjusted such that the leading edges of the sampling pulses occur substantially at the middle point of the voltage slopes of the sawtooth wave pulses (see FIG. 5c) when the revolving shaft 11 rotates at a desired speed. In a preferred mode of operation, it is desirable that the sawtooth waveform have alternating polarities with the zero voltage level lying at the middle point of the voltage slopes. When the speed of rotation is greater than the desired speed, the intervals between successive pulses become smaller than at the desired speed, and the sampling point drifts leftward in FIG. 5c to sample a negative voltage, while if the speed is smaller than the desired set point a positive voltage is sampled, so that the rotation of shaft 11 is controled at the desired speed. The increasing voltage developed by the ramp circuit 40 may be sliced off by means of a limiter (not shown) to provide a constant voltage level so that the sampling point occurs at the middle point of the slope.

Figure 4:
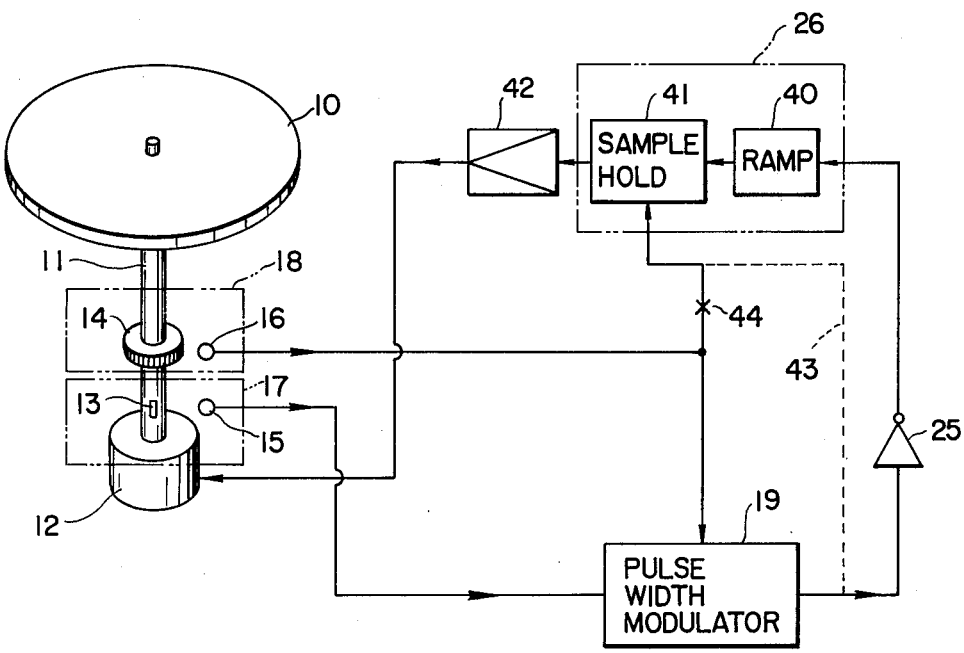
FIG. 4 is a circuit diagram of another arrangement of the invention.
Figure 5A:
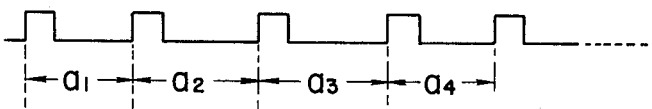
FIGS. 5a–5c is a waveform diagram useful for describing the operation of the FIG. 4 circuit.
Figure 5B:
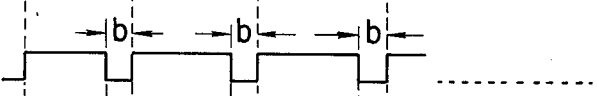
Figure 5C:
Figure 6:
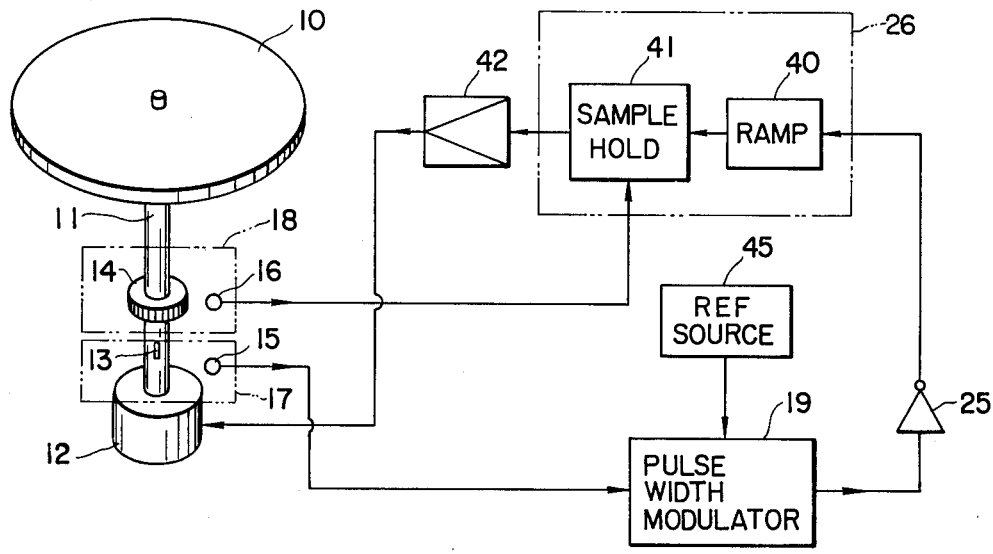
FIG. 6 is a circuit diagram of still another arrangement.
Figure 7A:
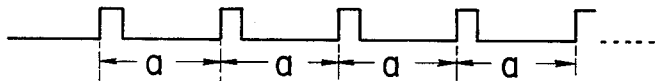
FIGS. 7a–7d is a waveform diagram useful for describing the operation of the FIG. 6 circuit.
Figure 7B:
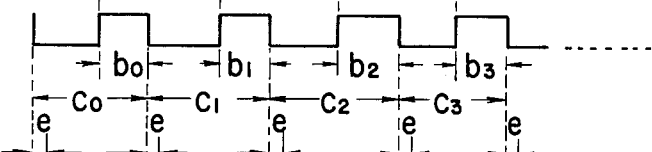
Figure 7C:
Figure 7D:
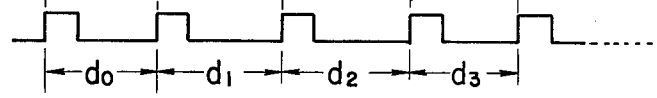

The circuit of FIG. 1 can be further modified to control the phase of the revolving body 10 in relation to a reference phase source 45 shown in a circuit arrangement of FIG. 6 which is similar to that shown in FIG. 4 except that the pulse width modulator 19 uses the reference pulses from the source 45 as a clock or shifting signal instead of using the output from the second pulse generator 18 for the same purpose. In a manner similar to that described above, the signal from the first pulse generator 17 is used as an input to the pulse width modulator 19 to be clocked thereinto by equally-spaced shift pulses (FIG. 7a) supplied from the reference pulse source 45 to generate a series of pulses (FIG. 7b) at the modulator output. The modulator output pulses are used to trigger the ramp circuit 40 at their trailing edge (FIG. 7c). Voltage sampling occurs at the leading edges of the pulses from the second pulse generator 18 (FIGS. 7c and 7d). The duration of pulses at the output of multivibrators $MM_1$ to $MM_n$ of modulator 19 is adjusted in such manner that their trailing edge occur at points in time preceding the pulses from the second generator 18 by a predetermined amount "e" at a given speed of shaft revolution. Preferably, the adjustment is made of each multivibrator such that the leading edges of the pulses from the second generator 18 occur at the middle portion of the slopes of voltage developed in the ramp circuit 40 are at the zero voltage level of alternating sawtooth waveform, at a desired speed of shaft revolution.

The invention so far described is only exemplary. Various modifications are possible without departing from the scope of the invention which is only limited by the appended claims.

What is claimed is:

1. A pulse duration correcting apparatus comprising, a shift register having a plurality of storage elements receptive of a train of first pulses as a binary data input to be stored therein and a train of second pulses as a clock signal to shift said data input through said storage elements, the number of said first and second pulses for a given time period being proportional to $z$ and $n.z$ where $z$ is an integer and $n$ is the number of said storage elements, and a plurality of monostable multivibrators each being receptive of the output from each said storage element and having a manually adjustable time constant value to permit correction of the duration of said second pulses.

2. In an apparatus for regulating the speed of a rotating body, including means for rotatably driving said body, a first pulse generating mechanism for developing a pulse for each rotation of said body, a second pulse generating mechanism for developing a predetermined number of pulses for each said rotation with a constant time relation to said pulse from the first mechanism, said pulses from the second generating mechanism being unequally spaced apart from each other, and a utilization circuit receptive of a series of equally spaced, speed-related pulses to deliver a control signal to said drive means to control said speed at a constant value, the combination comprising, a shift register having a row of storage elements equal in number to the pulses from said second generating mechanism generated for each said rotation and receptive of the pulse from said first generator as a binary digit to be shifted through said storage elements and further receptive of the pulses from said second generating mechanism as a clock signal to shift said binary digit, and a plurality of first monostable multivibrators having manually adjustable time constant values to permit correction of the width of the pulses therefrom, each said multivibrator being receptive of the output from each said storage element to provide a series of pulses having equally spaced-apart trailing edges at a given speed of rotation, and a second monostable multivibrator for generating a pulse of predetermined duration in response to each pulse of said series of pulses to provide equally spaced-apart pulses to serve as an input to said utilization circuit.

3. In an apparatus for regulating the speed of a rotating body, including means for driving said body, a first pulse generating mechanism providing a pulse for each rotation of said body, a second pulse generating mechanism providing a predetermined number of pulses for each said rotation with a constant time relation to said pulse from the first generating mechanism, said pulses from the second mechanism being unequally spaced apart from each other, and a utilization circuit receptive of a series of equally spaced-apart, speed-related pulses to deliver a control signal to said drive means to control said speed at a constant value, the combination comprising, a shift register having a row of storage elements equal in number to the pulses from said second generating mechanism generated for each said rotation and receptive of the pulse from said first generating mechanism as a binary digit to be shifted through said storage elements and further receptive of the pulses from said second generating mechanism as a clock signal to shift said binary digit, and a plurality of monostable multivibrators having manually adjustable time constant values to permit correction of the width of the pulses therefrom, each said multivibrator being receptive of the output from each said storage element to provide a series of equally spaced-apart pulses at a given speed of rotation to serve as an input to said utilization circuit.

4. In an apparatus for regulating the phase of a rotating body in relation to a reference phase, including means for driving said body, a first pulse generating mechanism providing a pulse for each rotation of said body, a second pulse generating mechanism providing a predetermined number of pulses for each said rotation with a constant time relation to the pulse from said first generating mechanism, said pulses from the second generating mechanism being unequally spaced apart from each other, a utilization circuit receptive of a series of speed-related pulses which are unequally spaced apart as the pulses from said second pulse generating mechanism to deliver a control signal to said drive means to control the phase of said rotating body at a constant relation with respect to said reference phase, and a source for generating a series of equally spaced-apart, constant duration pulses to serve as said reference phase, the combination comprising, a shift register having a row of storage elements equal in number to the pulses from said second generator produced for each rotation and receptive of the pulses from said first mechanism as a binary digit to be shifted through said storage elements and further receptive of said reference phase pulses as a clock signal to shift said binary digit, and a plurality of monostable multivibrators having manually adjustable time constant values to permit adjustment of the width of the pulses therefrom, each said multivibrator being receptive of the outputs from each said storage element to provide a series of pulses of different duration, there being equal time intervals between the trailing edges of the pulses from said multivibrators and the leading edge of the pulses from said second generator at a given speed of rotation.

5. In an apparatus for regulating the phase of a rotating body in relation to a reference phase, including means for driving said body, a first pulse generating mechanism providing a pulse for each rotation of said body, a second pulse generating mechanism providing a predetermined number of pulses for each said rotation with a fixed time relation to the pulse from said first generating mechanism, said pulses from the second generating mechanism being unequally spaced apart from each other, a utilization circuit receptive of a series of equally spaced-apart, speed-related pulses to deliver a control signal to said drive means to control the phase of said rotating body at a constant relation with respect to said reference phase, and a source for generating a series of equally spaced-apart, constant duration pulses to serve as said reference phase, the combination comprising, a shift register having a row of storage elements equal in number to the pulses from said second mechanism produced for each said rotation and receptive of the pulse from said first mechanism as a binary digit to be shifted through said storage elements and further receptive of the pulses from said second mechanism as a clock signal to shift said binary digit, and a plurality of monostable multivibrators each being receptive of the output from each said storage element and having a manually adjustable time constant value to permit correction of the duration of the pulses from said second mechanism to provide a series of pulses of different duration, there being equal time intervals between the trailing edges of the pulses from said multivibrators and said reference phase pulses at a given speed of rotation.

6. In an apparatus for regulating the speed and phase of a rotating body, including means for driving said body, a first pulse generating mechanism generating a pulse for each rotation of said body, a second pulse generating mechanism generating a predetermined number of pulses for each said rotation with a constant time relation to the pulse from said first generating mechanism, said pulses from the second generating mechanism being unequally spaced apart from each other, a first utilization circuit receptive of a series of pulses with equally spaced-apart trailing edges for generating a speed control signal, a second utilization circuit including a source of a reference phase and receptive of said series of pulses for generating a phase control signal, and a summing circuit for combining said speed and phase control signals, said combined signals being coupled to said drive means to control the speed of rotation of said body at a constant value and the phase of said body at a constant relation with respect to said reference phase, the combination comprising, a shift register having a row of storage elements equal in number to the pulses from said second generating mechanism produced for each said rotation and receptive of the pulse from said first generating mechanism as a binary digit to be shifted through said storage elements and further receptive of the pulses from said second generating mechanism as a clock signal to shift said binary digit, and a plurality of monostable multivibrators each being receptive of the output from each said storage element and having manually adjustable time constant values to permit correction of the duration of the pulses from said second generating mechanism to provide a series of pulses with equally spaced-apart trailing edges at a given speed of rotation to serve as inputs to said first and second utilization circuits.

7. The combination as claimed in claim 2, wherein said utilization circuit comprises:
a ramp circuit triggered by the trailing edges of the pulses from said second monostable multivibrator for generating incremental voltages,
a sampling and hold circuit for sampling said incremental voltages at the leading edges of the pulses from said second monostable multivibrator and holding the sampled voltages, and means for delivering an output of said sampling and hold circuit as said control signal to said drive means.

8. An apparatus as claimed in claim 3, wherein said utilization circuit comprises:
a ramp circuit triggered by the trailing edges of the pulses of said input to the utilization circuit for generating incremental voltages,
a sampling and hold circuit for sampling said incremental voltages at leading edges of the pulses of said input to the utilization circuit and holding the sampled voltages, and
means for delivering an output of said sampling and hold circuit as said control signal to said drive means.

9. An apparatus as claimed in claim 8, wherein said monostable multivibrators are adjusted such that said sampling occurs substantially at the middle portion of the slope of said incremental voltage at a given speed of rotation of said body.

10. An apparatus as claimed in claim 4, wherein said utilization circuit comprises:
a ramp triggered by said trailing edges of the pulses from said multivibrators for generating incremental voltages,
a sampling and hold circuit for sampling said incremental voltages at said leading edges of the pulses from said second generator and holding the sampled voltages, and
means for delivering an output of said sampling and hold circuit as said control signal to said drive means.

11. An apparatus as claimed in claim 10, wherein said monostable multivibrators are adjusted such that said sampling occurs substantially at the middle portion of the slope of said incremental voltages when the phase of said rotating body is in a given relation with respect to said reference phase.

* * * * *